United States Patent
Jin

(10) Patent No.: US 9,408,444 B2
(45) Date of Patent: Aug. 9, 2016

(54) LIGHTING UMBRELLA

(71) Applicant: Linhai Zhongtian Electronic Appliance CO.,Ltd, Linhai (Zhejiang province) (CN)

(72) Inventor: Shimin Jin, Linhai (CN)

(73) Assignee: LINHAI ZHONGTIAN ELECTRONIC APPLIANCE CO., LTD, Linhai (CN)

( * ) Notice: Subject to any disclaimer, the term of this patent is extended or adjusted under 35 U.S.C. 154(b) by 0 days.

(21) Appl. No.: 14/634,784

(22) Filed: Feb. 28, 2015

(65) Prior Publication Data

US 2016/0183646 A1 Jun. 30, 2016

(30) Foreign Application Priority Data

Dec. 29, 2014 (CN) .......................... 2014 1 0832999

(51) Int. Cl.
*A45B 3/04* (2006.01)
*F21V 1/06* (2006.01)
*F21V 33/00* (2006.01)
*F21V 8/00* (2006.01)
*F21V 23/04* (2006.01)
*F21V 19/00* (2006.01)
*F21Y 101/02* (2006.01)

(52) U.S. Cl.
CPC ................. *A45B 3/04* (2013.01); *F21V 19/005* (2013.01); *F21V 23/0414* (2013.01); *F21V 33/0004* (2013.01); *G02B 6/0096* (2013.01); *F21Y 2101/02* (2013.01)

(58) Field of Classification Search
CPC ............ A45B 3/04; A45B 3/02; A45B 25/02; A45B 25/06; A45B 25/10; A45B 2200/1018; F21Y 2101/02; F21V 23/0414; F21V 19/005; F21V 33/0004; F21V 1/06; F21V 21/08; G02B 6/0096
USPC .................. 135/15.1, 16, 91, 98, 28–32, 910; 362/102
See application file for complete search history.

(56) References Cited

U.S. PATENT DOCUMENTS

| | | | | |
|---|---|---|---|---|
| 5,911,493 A | * | 6/1999 | Walker | A45B 3/04 135/16 |
| 6,089,727 A | * | 7/2000 | Wu | A45B 3/04 135/910 |
| 6,598,990 B2 | * | 7/2003 | Li | A45B 3/04 362/102 |
| 6,837,255 B2 | * | 1/2005 | Bunch | A45B 3/04 135/16 |
| 6,840,657 B2 | * | 1/2005 | Tung | A45B 3/04 135/910 |
| 7,000,624 B2 | * | 2/2006 | Chang | A45B 3/04 135/16 |

(Continued)

*Primary Examiner* — Winnie Yip
(74) *Attorney, Agent, or Firm* — Wayne & King LLC

(57) ABSTRACT

A novel lighting umbrella, comprising a lower hub (2) and an upper hub (6) secured on the top of a shaft (3), one end of each of long ribs (4) being articulated with the upper hub (6) while the other end thereof supporting a panel, one end of each of short ribs (1) being articulated with the lower hub (2) while the other end thereof being articulated with the middle portion of one of the long ribs (4), characterized in that a notch (101) having a light emitting device therein is formed in one or both of the long ribs (4) and the short ribs (1); the light emitting device comprises a light guide bar (14) clamped inside the notch (101) and provided with a light source on its end surface; and the light source is secured on a fixed base (7) that is fixedly connected to the ribs and sleeved with a stopper (8) for protection.

3 Claims, 14 Drawing Sheets

(56) References Cited

U.S. PATENT DOCUMENTS

| | | | | |
|---|---|---|---|---|
| 7,422,343 B2 * | 9/2008 | Li | ............................ | A45B 3/04 135/16 |
| 7,431,469 B2 * | 10/2008 | Li | ............................ | A45B 3/00 135/910 |
| 7,604,015 B2 * | 10/2009 | Fraser | ....................... | A45B 3/04 135/16 |
| 2006/0070642 A1 * | 4/2006 | Lo | ............................ | A45B 3/04 135/16 |
| 2006/0254636 A1 * | 11/2006 | Tung | ......................... | A45B 3/00 135/96 |
| 2007/0291473 A1 * | 12/2007 | Traynor | ................. | A01K 11/00 362/106 |
| 2008/0105287 A1 * | 5/2008 | Huali | ....................... | A45B 3/04 135/16 |

\* cited by examiner

LIGHTING UMBRELLA

CROSS-REFERENCE TO RELATED APPLICATIONS

This application is a continuation of, and claims priority to, Chinese Patent Application No. 201410832999.6 with a filing date of Dec. 29, 2014. The content of the aforementioned application, including any intervening amendments thereto, is incorporated herein by reference.

TECHNICAL FIELD

The utility model relates to the technical field of sunshade umbrellas, in particular to a novel lighting umbrella.

BACKGROUND OF THE INVENTION

Sunshade umbrellas are leisure products frequently used in people's daily life. At present, there are a wide variety of sunshade lighting umbrellas among which those having a plurality of LED lamp beads mounted on the ribs are commonly used. However, during the production, the necessity of drilling on every one of the ribs makes the strength of the ribs degraded so that the sunshade umbrellas are likely to be damaged. Mounting these LED lamp beads into the bores is both time and labor consuming. Furthermore, to realize the desired lighting effect, a lot of lamp beads are needed. However, the excessive lamp beads lead to excessive circuits, causing the mounting more complicated. On the other hand, once an individual lamp bead burns or an individual circuit breaks down, the use of the whole umbrella will be influenced and the maintenance is particularly inconvenient.

SUMMARY OF THE INVENTION

With regard to the problems in the prior art, an objective of the utility model is to provide a technical solution of a novel lighting umbrella.

A novel lighting umbrella is provided, including a lower hub and an upper hub secured on the top of a shaft, one end of each of long ribs being articulated with the upper hub while the other end thereof supporting a panel, one end of each of short ribs being articulated with the lower hub while the other end thereof being articulated with the middle portion of one of the long ribs, characterized in that a notch having a light emitting device therein is formed in one or both of the long ribs and the short ribs; the light emitting device includes a light guide bar clamped inside the notch and provided with a light source on its end surface; and the light source is secured on a fixed base that is fixedly connected to the ribs and sleeved with a stopper for protection.

The novel lighting umbrella as described above is characterized in that a second wire connecting plate is provided inside the upper hub, a first wire connecting plate is provided inside the lower hub, and a light source wire is arranged inside a short rib; one end of the wire is connected to the first wire connecting plate, while the other end thereof passes through an articulator by which a long rib is articulated with a short rib and through the long rib to be electrically connected to the second wire connecting plate; and the second wire connecting plate is electrically connected to a switch and a power supply.

The novel lighting umbrella as described above is characterized in that a first wire connecting plate is provided inside the lower hub, and a light source wire is arranged inside a short rib; and, one end of the wire is electrically connected to the first wire connecting plate, while the other end thereof passes through an articulator by which a long rib is articulated with a short rib and through the long rib to be electrically connected to the power supply that is externally connected to a switch.

The novel lighting umbrella as described above is characterized in that the light source includes an SMD LED lamp and a PCB lamp panel, which are connected to each other by welding; a through hole is formed inside the fixed base, the PCB lamp panel is inserted into and secured in the through hole inside the fixed base; and, the SMD LED lamp clings to the light guide bar and the PCB lamp panel is connected to the power supply wire.

The novel lighting umbrella as described above is characterized in that two notches, i.e., an upper notch and a lower notch, are provided on each of the short ribs and the long ribs among the ribs, respectively, each notch having a clamping flange on its edge for clamping the light guide bar; and, a jack is formed on the cross-section of a side plate of each notch corresponding to that of the fixed base, and the fixed base is inserted into the jack to be secured on the ribs.

The novel lighting umbrella as described above is characterized in that each of the upper hub and the lower hub consists of a hub cap and a hub holder; an annular ring having a plurality of wire lead-out holes on its outer circle is provided inside the hub holder, with two symmetrical trapezoidal limiting blocks being provided on any one of the wire lead-out holes; and, an arc bayonet for locking decorative parts or the power supply is provided on the inner circle of the hub cap, with a corresponding arc bump being provided on the decorative parts connecting ring.

The novel lighting umbrella as described above is characterized in that the switch wire of the switch is connected to the power supply through a notch on any one of the long ribs.

The novel lighting umbrella as described above is characterized in that the switch wire of the switch is connected to the power supply through the interior of the shaft.

The novel lighting umbrella as described above is characterized in that there are at least two light guide bars clamped on any one of the long ribs, two fixed bases for securing the corresponding light guide bars are provided at positions where the light guide bars inside the long ribs are butt jointed with the light guide bars, and the butt-joints are sleeved with a wrapper.

The novel lighting umbrella as described above is characterized in that a diffusing bar is clamped inside the notch, a PCB light bar having PCB lamps welded thereon is provided between the diffusing bar and the notch, and the PCB light bar is secured to the ribs by welding the PCB lamp panel and sleeved with a stopper for protection.

With rational structure design, by providing light guide bars on the short ribs and making the SMD LED lamps cling to the light guide bars, a light band is formed through continuous refraction and reflection to realize the purposes of lighting and beautifying the environment in night; connecting a plurality of light guide bars in series in coordination with the power supply to guide light for the long ribs effectively avoids decreasing the brightness due to too long light guide bars; and both the assembly and the maintenance are more convenient and less time and labor consuming.

BRIEF DESCRIPTION OF THE DRAWINGS

FIG. 14 is a structure diagram of a hub; in which:

Figure 1:
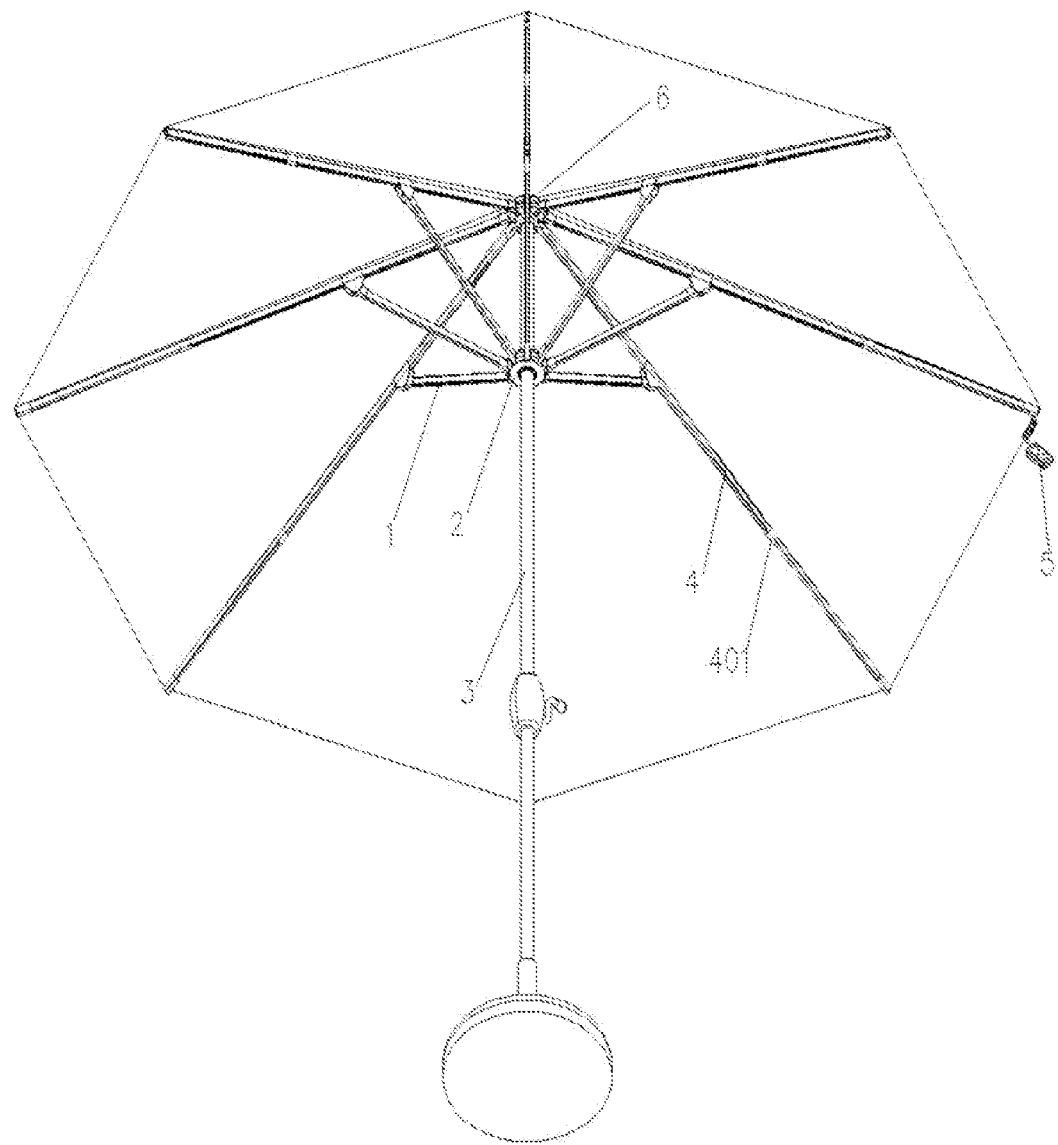
FIG. 1 is an overall structure diagram of the utility model.
Figure 2:
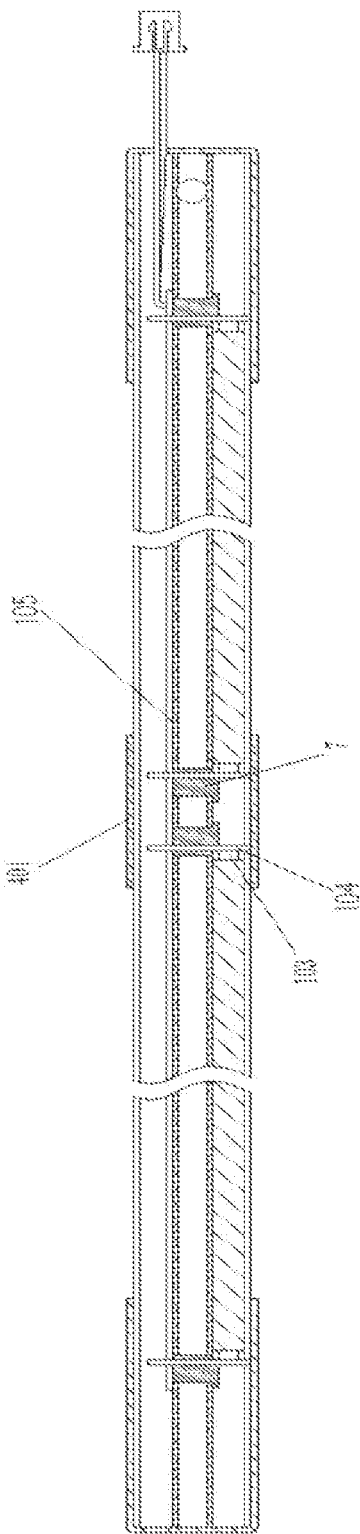
FIG. 2 is a cross-sectional structure diagram of a long rib.
Figure 3:
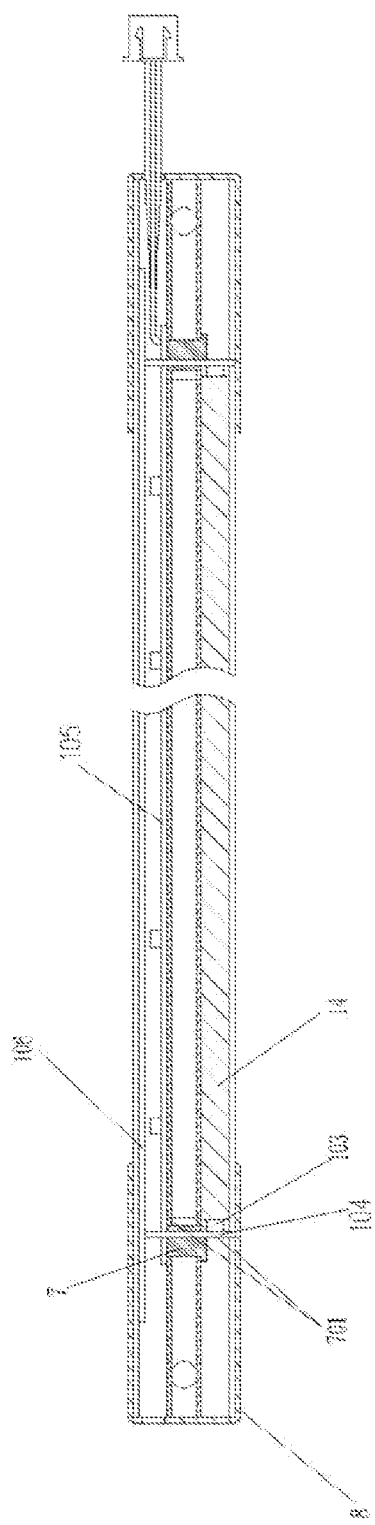
FIG. 3 is a cross-sectional structure diagram of a short rib.
Figure 4:
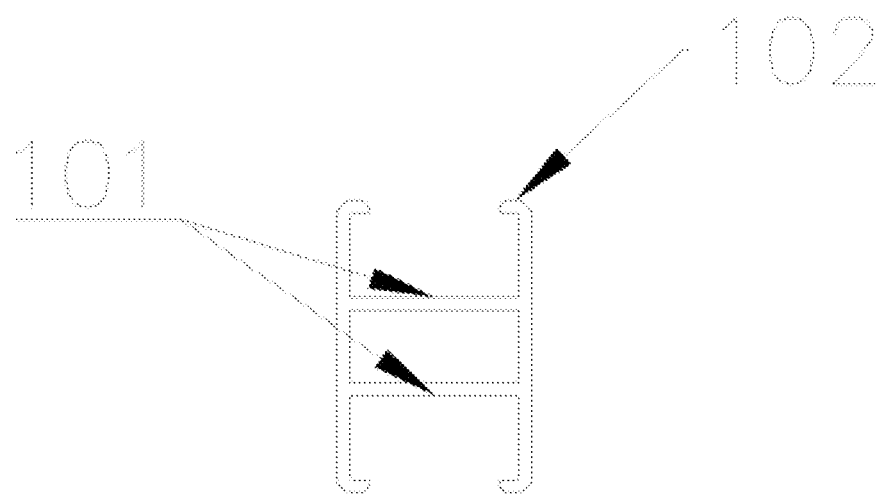
FIG. 4 is a cross-sectional diagram of a rib.
Figure 5:
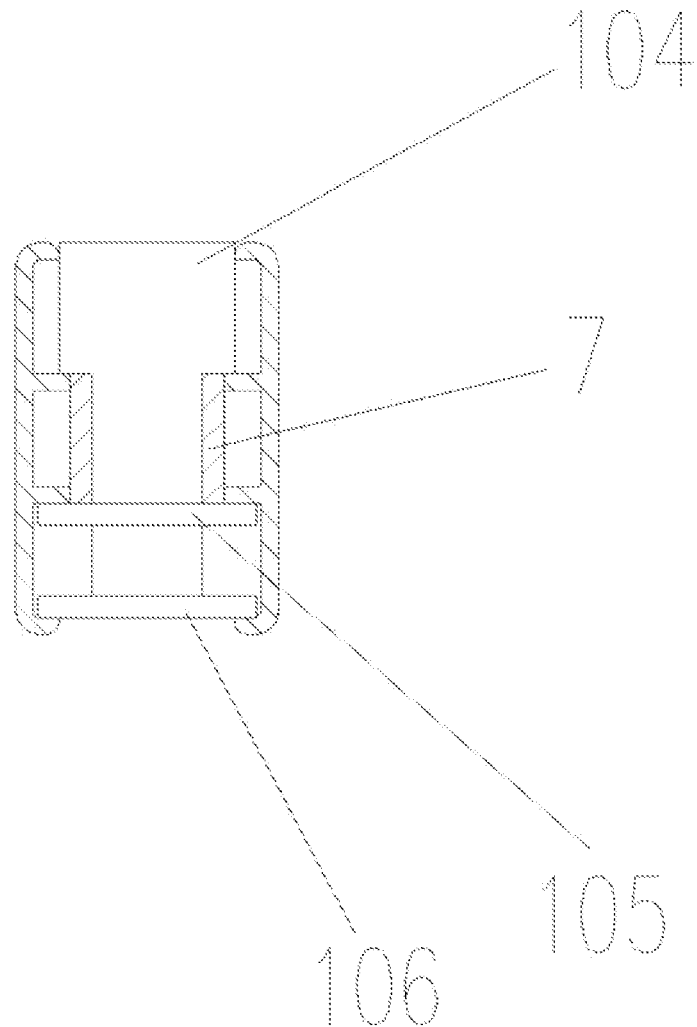
FIG. 5 is a cross-sectional structure diagram of a light emitting device.
Figure 6:
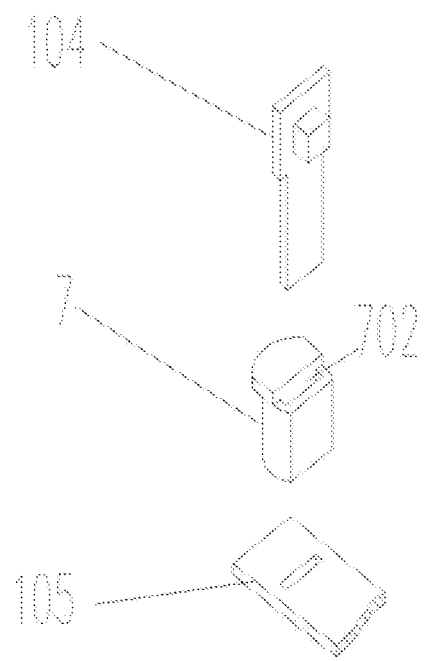
FIG. 6 is a partially exploded structure diagram of the light emitting device.
Figure 7:
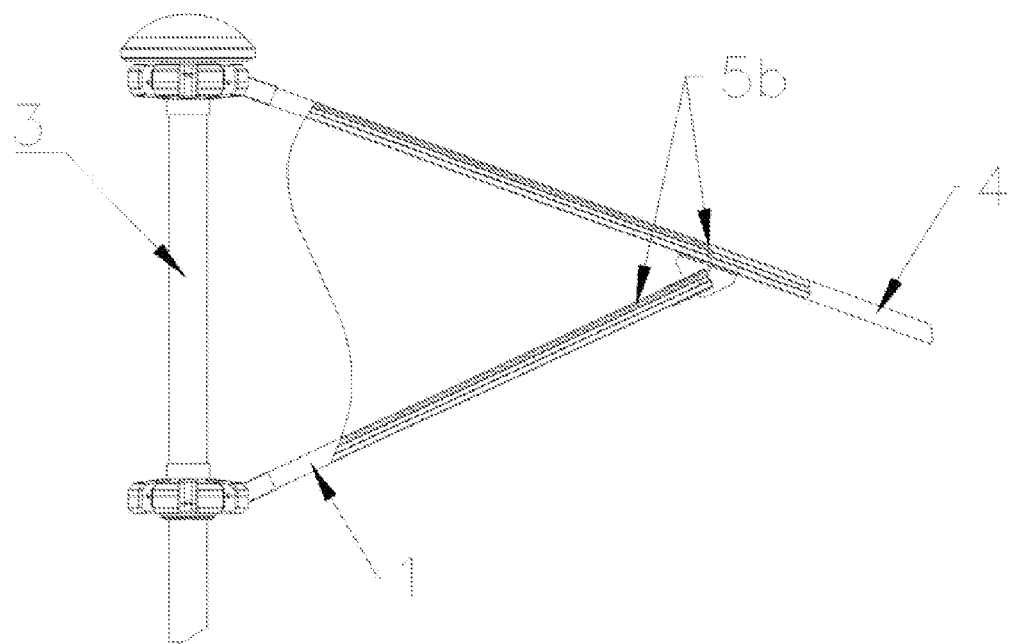
FIG. 7 is a diagram showing the running of a light source wire on a short rib.
Figure 8:
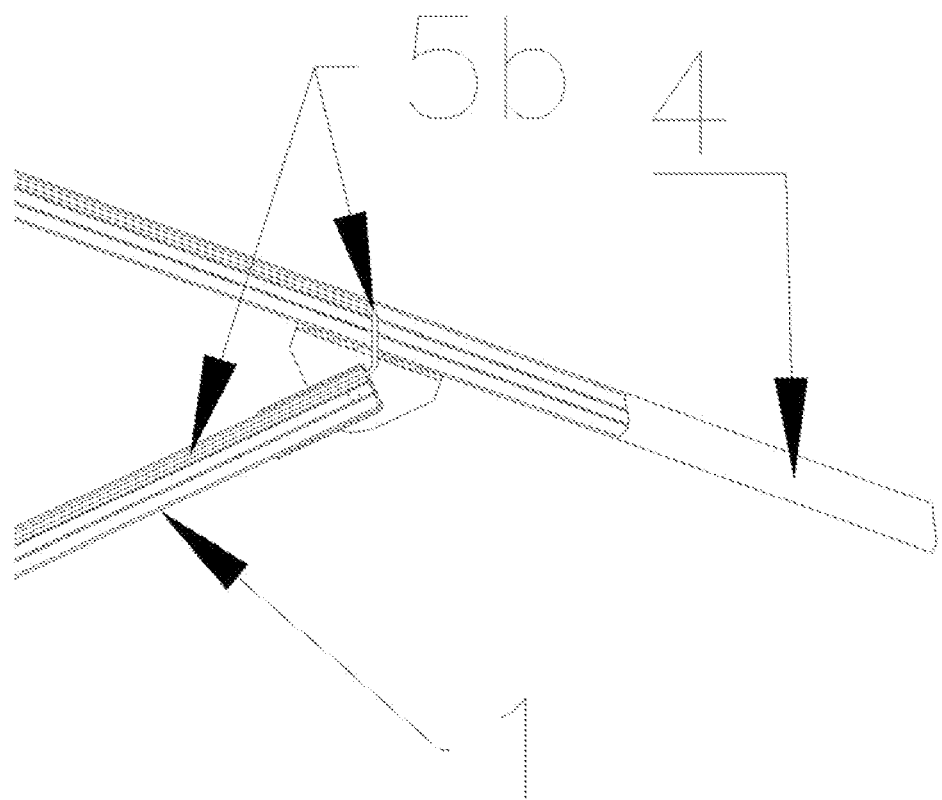
FIG. 8 is a partially enlarged diagram showing the running of a light source wire on a short rib.
Figure 9:
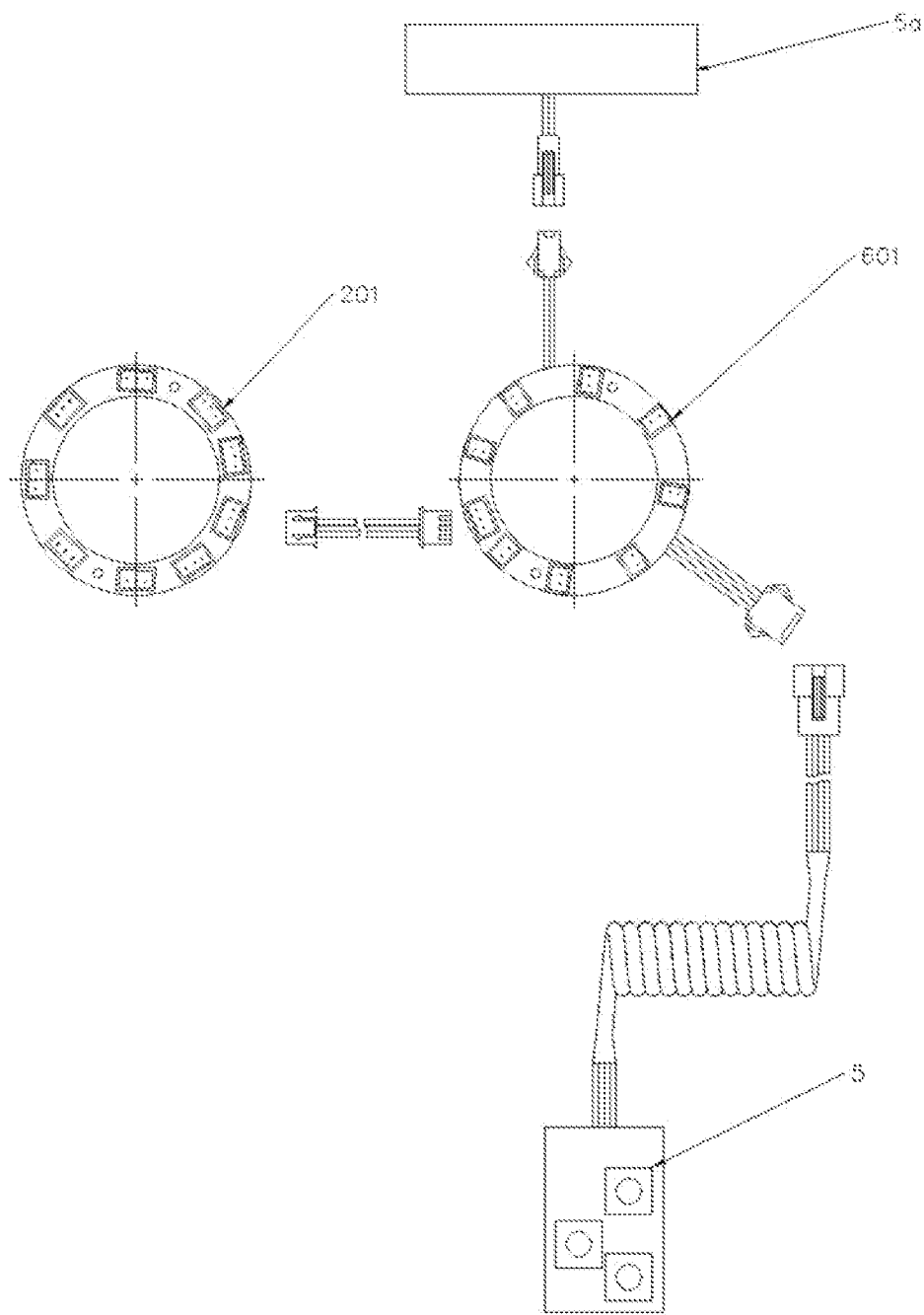
FIG. 9 is a structure diagram of the electrical connection.
Figure 10:
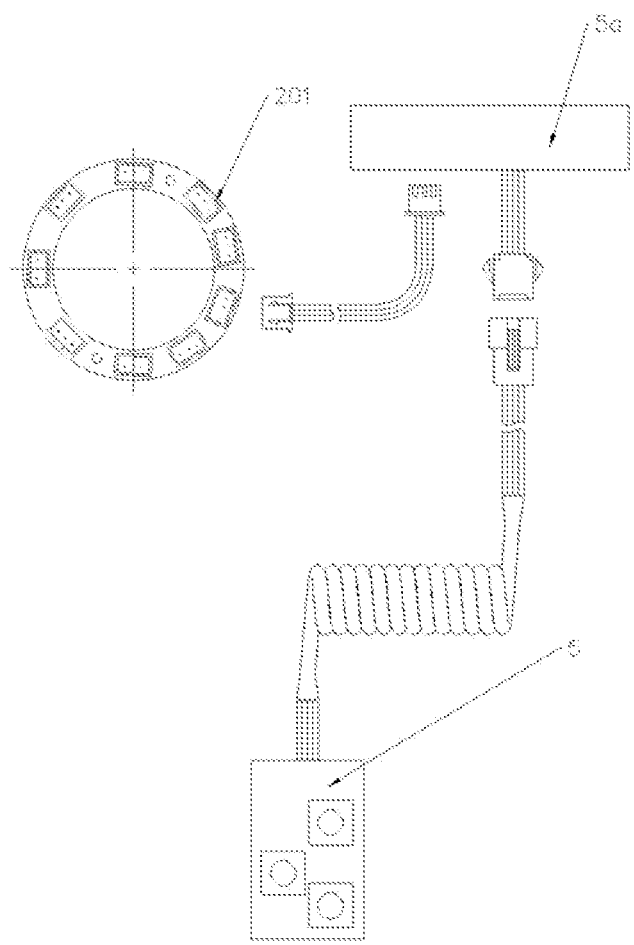
FIG. 10 is another structure diagram of the electrical connection.
Figure 11:
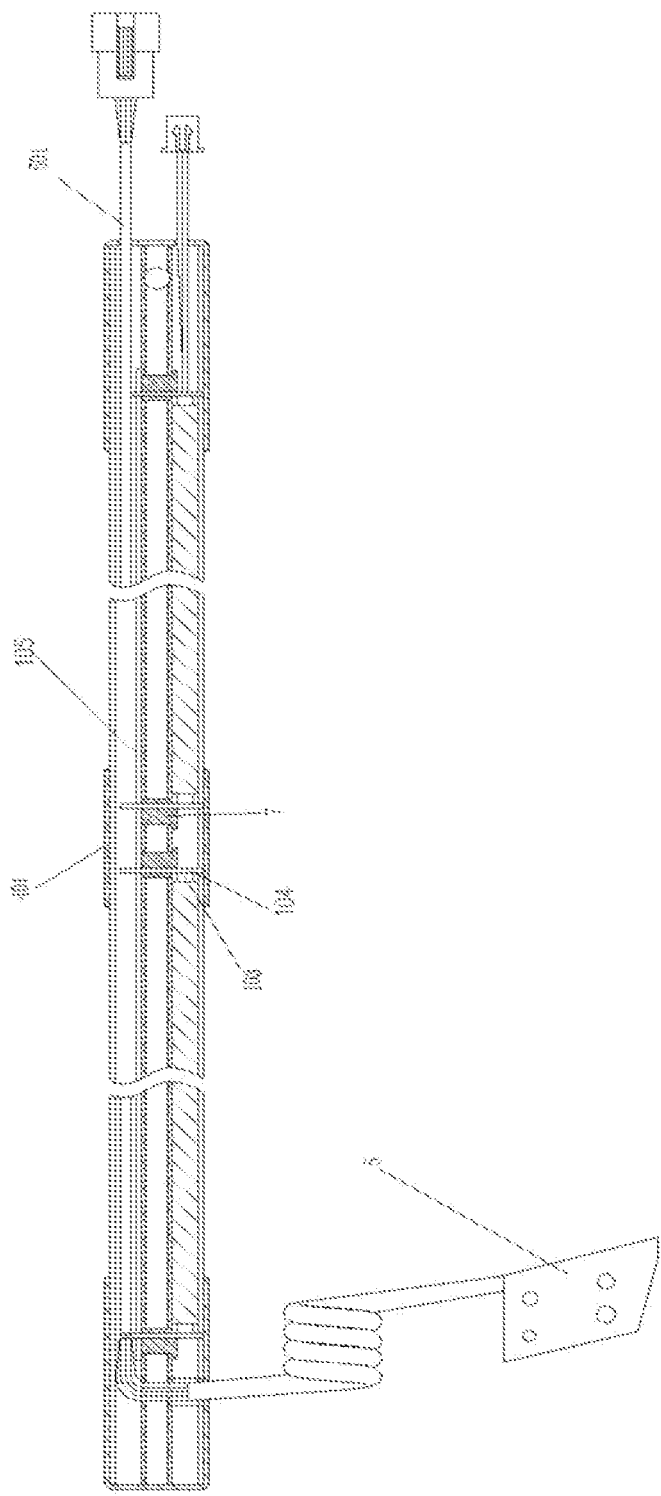
FIG. 11 is a layout of a switch wire.
Figure 12:
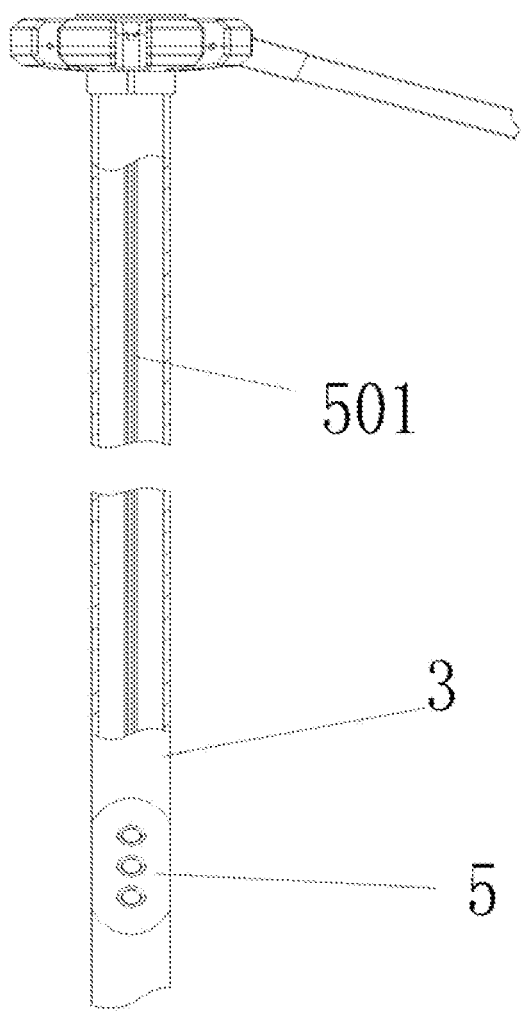
FIG. 12 is another layout of the switch wire.
Figure 13:
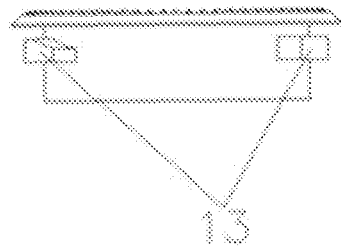
FIG. 13 is a structure diagram of decorative parts.
Figure 14:
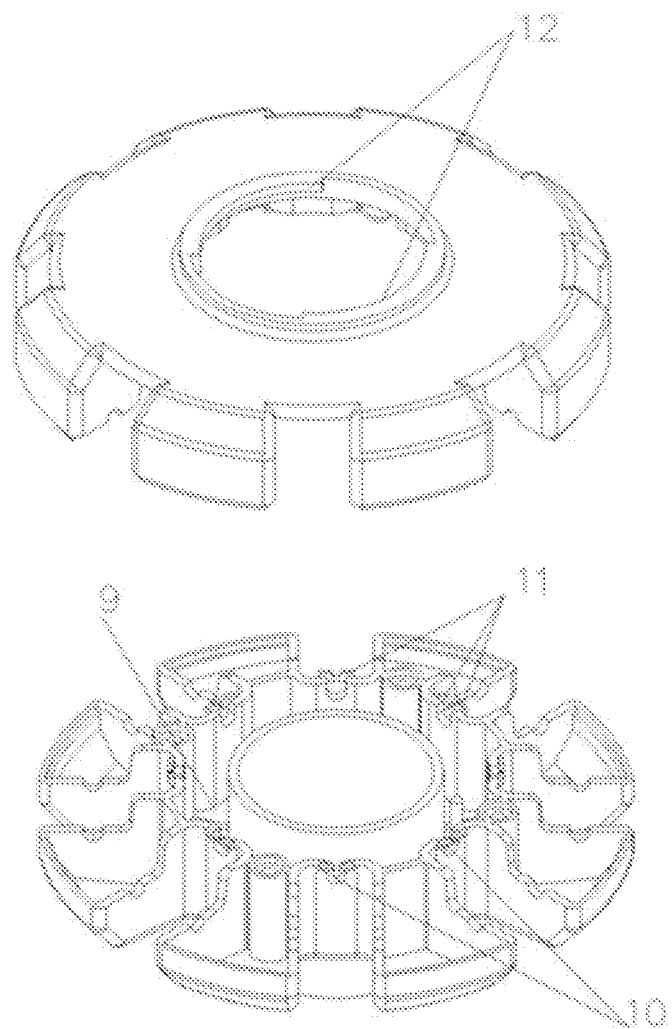

1: Short rib; 2: Lower hub; 3: Shaft; 4: Long rib; 5: Switch; 5a: Power supply; 5b: Light source wire; 6: Upper hub; 7: Fixed base; 8: Stopper; 9: Annular ring; 10: Wire lead-out hole; 11: Limiting block; 12: Arc bayonet; 13: Arc bump; 14: Light guide bar; 101 Notch; 102: Clamping flange; 103: SMD LED lamp; 104: PCB lamp panel; 105: PCB light bar; 106: Diffusing bar; 201: First wire connecting plate; 401: Wrapper; 501: Switch wire; 601: Second wire connecting plate; 701: Jack; 702: Through hole.

DETAILED DESCRIPTION OF THE INVENTION

The utility model will be further described in details as below with reference to the accompanying drawings.

A novel lighting umbrella is provided, including a lower hub 2, an upper hub 6 secured on the top of a shaft 3, and ribs, one end of each of long ribs 4 being articulated with the upper hub 6 while the other end thereof supporting a panel, one end of each of short ribs 1 being articulated with the lower hub 2 while the other end thereof being articulated with the middle portion of one of the long ribs 4. A notch 101 is formed in one or both of the long ribs 4 and the short ribs 1. There may be one or two notches 101 in each of the long ribs 4 or the short ribs 1, each notch 101 having a light emitting device provided therein. The light emitting device comprises a light guide bar 14 clamped inside the notch 101, and a clamping flange 102 that can clamp the light guide bar 14 to prevent it from falling off is provided on the edge of the notch 101. The light guide bar 14 is provided with a light source on its end surface. The light source includes an SMD LED lamp 103 and a PCB lamp panel 104, which are connected to each other by welding, and the light source is secured on a fixed base 7. A jack 701 is formed on the cross-section of a side plate of each notch 101 corresponding to that of the fixed base 7, and the fixed base 7 is inserted into the jack 701 to be secured on the ribs and sleeved with a stopper 8 for protection. A through hole 702 is formed inside the fixed base 7, the PCB lamp panel 104 is inserted into and secured in the through hole 702 inside the fixed base 7, that is, the PCB lamp panel may be secured on the fixed base 7. The SMD LED lamp 103 clings to the light guide bar 14, and after the PCB lamp panel is well connected to and powered by the power supply, light from the SMD LED lamp enters the light guide bar 14 and forms a light band by continuous refraction and reflection inside the light guide bar, thereby realizing the purposes of lighting and beatifying the environment.

A second wire connecting plate 601 is provided inside the upper hub 6, a first wire connecting plate 201 is provided inside the lower hub 2, and a light source wire 5b is arranged inside a short rib 1; one end of the wire is connected to the first wire connecting plate 201, while the other end thereof passes through an articulator by which a long rib 4 is articulated 1 a short rib 1 and through the long rib 4 to be electrically connected to the second wire connecting plate 601 and the second wire connecting plate 601 is electrically connected to a switch 5 and a power supply 5a. When there is no light guide bar provided on a long rib 4, it is unnecessary to provide the second wire connecting plate 601 inside the hub 6 accordingly, that is, one end of the light source wire 5b arranged inside a short rib 1 is electrically connected to the first wire connecting plate 201 while the other end thereof passes through an articulator by which a long rib 4 is articulated with a short rib 1 and through the long rib 4 to be electrically connected to the power supply 5a that is externally connected to a switch 5.

When there is no light guide bar on a short rib 1, it is unnecessary to provide the first wire connecting plate 201 and the light source wire 5b inside the hub 2 accordingly, that is, the second wire connecting plate 601 inside the hub 6 is electrically connected to the switch 5 and the power supply 5a. The three specific circuit connection manners as described above may supply power to the light emitting device better.

There is at least one light guide bar 14 clamped on any one of the long ribs 4. When there are many light guide bars 14, two fixed bases 7 for fixing the corresponding light guide bars are provided at positions where the light guide bars inside the long ribs 4 are butt jointed with the light guide bars, and the butt-joints are sleeved with a wrapper 401. It is better to provide a plurality of light guide bars on the long ribs to realize uniform light entering the light guide bars 14 from the SMD LED lamp, good refraction and reflection effects easier formation light band, and better lighting and environment beatification effects.

Each of the upper hub 6 and the lower hub 2 of the novel lighting umbrella provided by the utility model consists of a hub cap and a hub holder; an annular ring 9 having a plurality of wire lead-out holes 10 on its outer circle is provided inside the hub holder, with two symmetrical trapezoidal limiting blocks 11 being provided on any one of the wire lead-out holes 10; and, an arc bayonet 12 for clamping decorative parts or the power supply is provided on the inner circle of the hub panel, with a corresponding arc bump 13 being provided on the decorative parts connecting ring.

The switch wire 501 of the switch 5 may be connected to the power supply 5a through a notch 101 on any one of the long ribs 4, or connected to the power supply 5a through the interior of the shaft 3. That is, the switch S may be directly hung on a certain long rib 4 or secured on the shaft 3.

A diffusing bar 106 is clamped inside the notch 101; a PCB light bar 105 having PCB lamps welded thereon is provided between the diffusing bar 106 and the notch 101, and the PCB light bar 105 is secured to the ribs by welding the PCB lamp panel 104 and sleeved with a stopper 8 for protection. The technical solution as described above constitutes a novel light emitting device that may also be used with the light guide bar structure.

The number of the ribs of this lighting umbrella is not limited. The lighting umbrella may include four ribs, six ribs, eight ribs, etc. The lighting umbrella is also not limited to an upright umbrella or roman umbrella in terms of shape. Any equivalent replacements or improvements made without departing from the principle of this structure shall be deemed as falling into the protection scope of the utility model.

I claim:

1. A novel lighting umbrella, comprising a lower hub (2) and an upper hub (6) secured on the top of a shaft (3), one end of each of long ribs (4) being articulated with the upper hub (6) while the other end thereof supporting a panel, one end of each of short ribs (1) being articulated with the lower hub (2) while the other end thereof being articulated with the middle portion of one of the long ribs (4), characterized in that a notch (101) having a light emitting device therein is formed in one or both of the long ribs (4) and the short ribs (1); the light emitting device comprises a light guide bar (14) clamped inside the notch (101) and provided with a light source on its end surface; the light source is secured on a fixed base (7) that is fixedly connected to the ribs and sleeved with a stopper (8) for protection; the light source comprises an SMD LED lamp (103) and a PCB lamp panel (104), which are connected to each other by welding; a through hole (702) is formed inside the fixed base (7), the PCB lamp panel (104) is inserted into and secured in the through hole (702) inside the fixed base (7); and, the SMD LED lamp (103) clings to the light guide bar (14) and the PCB lamp panel is connected to a power supply wire.

2. A novel lighting umbrella, comprising a lower hub (2) and an upper hub (6) secured on the top of a shaft (3), one end of each of long ribs (4) being articulated with the upper hub (6) while the other end thereof supporting a panel, one end of each of short ribs (1) being articulated with the lower hub (2) while the other end thereof being articulated with the middle portion of one of the long ribs (4), characterized in that two notches (101), an upper notch and a lower notch, are provided on each of the short ribs (1) and the long ribs (4) among the ribs, respectively, each notch (101) having a clamping flange (102) on its edge for clamping the light guide bar (14); a jack (701) is formed on the cross-section of a side plate of each notch (101) corresponding to that of the fixed base (7), and the fixed base (7) is inserted into the jack (701) to be secured on the ribs; the light emitting device comprises a light guide bar (14) clamped inside the notch (101) and provided with a light source on its end surface; the light source is secured on a fixed base (7) that is fixedly connected to the ribs and sleeved with a stopper (8) for protection.

3. A novel lighting umbrella, comprising a lower hub (2) and an upper hub (6) secured on the top of a shaft (3), one end of each of long ribs (4) being articulated with the upper hub (6) while the other end thereof supporting a panel, one end of each of short ribs (1) being articulated with the lower hub (2) while the other end thereof being articulated with the middle portion of one of the long ribs (4), characterized in that each of the upper hub (6) and the lower hub (2) consists of a hub cap and a hub holder; an annular ring (9) having a plurality of wire lead-out holes (10) on its outer circle is provided inside the hub holder, with two symmetrical trapezoidal limiting blocks (11) being provided on any one of the wire lead-out holes (10); an arc bayonet (12) for locking decorative parts or the power supply is provided on the inner circle of the hub cap, with a corresponding arc bump (13) being provided on a decorative parts connecting ring; a notch (101) having a light emitting device therein is formed in one or both of the long ribs (4) and the short ribs (1); the light emitting device comprises a light guide bar (14) clamped inside the notch (101) and provided with a light source on its end surface; the light source is secured on a fixed base (7) that is fixedly connected to the ribs and sleeved with a stopper (8) for protection.

\* \* \* \* \*